June 18, 1968     H. VISSERS     3,388,869
APPARATUS FOR SPREADING POWDERED OR GRANULAR MATERIALS
Filed Sept. 27, 1966
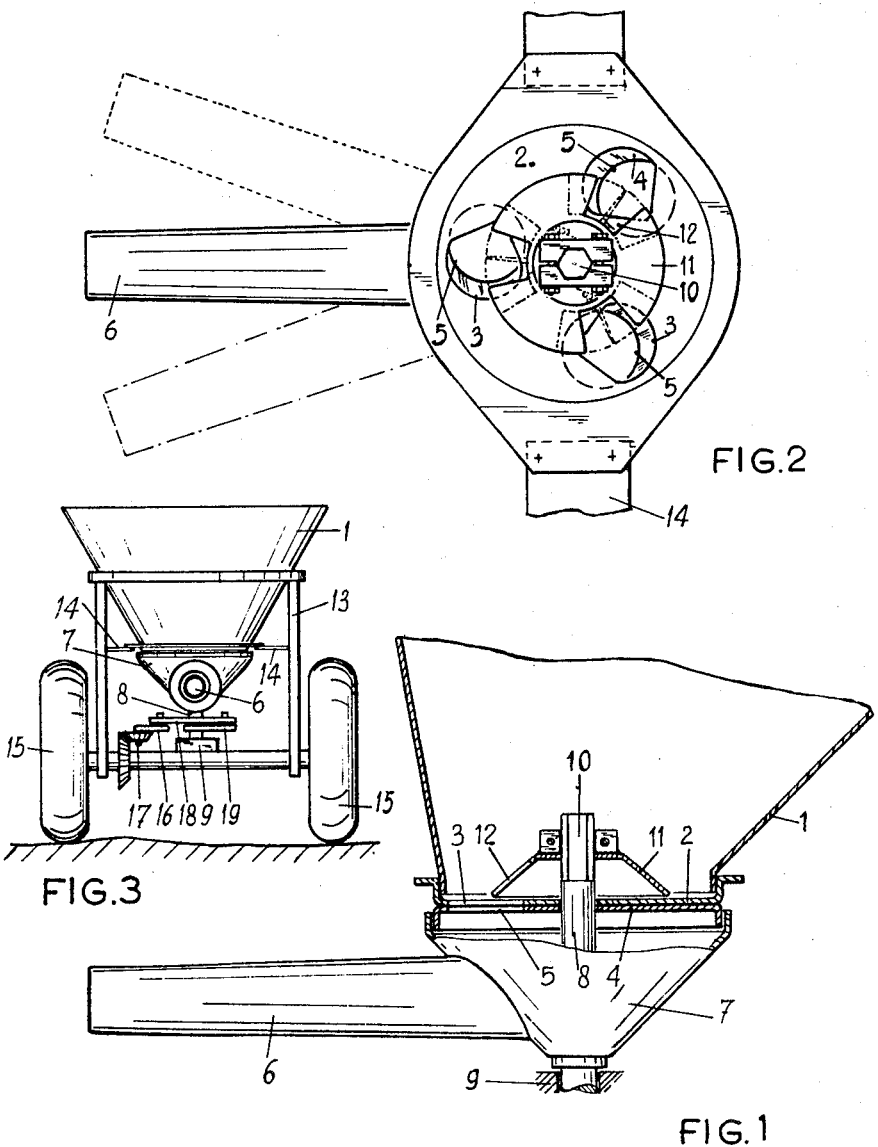
INVENTOR
HERBERT VISSERS
BY
ATTORNEY

United States Patent Office 3,388,869
Patented June 18, 1968

3,388,869
APPARATUS FOR SPREADING POWDERED OR GRANULAR MATERIALS
Herbert Vissers, Nieuw Vennep, Netherlands, assignor to Landbouwwerktuigen- en Machinefabriek H. Vissers N.V., Nieuw Vennep, Netherlands, a company of the Netherlands
Filed Sept. 27, 1966, Ser. No. 582,305
Claims priority, application Netherlands, Oct. 27, 1965, 6,513,895
4 Claims. (Cl. 239—659)

ABSTRACT OF THE DISCLOSURE

The bottom wall of a hopper and the skirt portion of an agitating member are arranged to define a pocket therebetween with the skirt having a notch extending from its marginal edge and adapted for relative oscillation about a mean position located above an aperture in the bottom wall.

This invention relates to an apparatus for spreading powdered or granular materials and provided with a storage hopper, having in its bottom one or more passage holes and a spreading member rotating or angularly reciprocating below said bottom and an agitating member located in the storage hopper above said bottom.

With known apparatus of this kind the agitating means are usually constituted by a set of upright or horizontal rodlike elements adapted to promote a uniform discharge of the material from the hopper but such rods have the drawback that with granular materials the grains will be broken.

The invention has for its object to remove said drawback of the known agitating members and according to the invention the agitating member consists of a bowl-shaped body having its open side directed downwards and having its circumferential wall enclosing an acute angle with the bottom of the hopper and said wall being provided with one or more apertures or recesses extending to the lower edge of said wall. The material under the influence of the movement of the agitating member with respect to the bottom of the hopper will slide along the circumferential wall of said member so that it is in motion and by the edge of the apertures in said wall the material is pushed through the hole in the bottom of the hopper.

The invention will be further described with reference to the accompanying drawing, showing an embodiment of the spreading apparatus according to the invention.

In the drawing FIG. 1 shows a sectional elevation of the lower part of the hopper and of the bowl located below the hopper.

FIG. 2 is a plan-view with the hopper omitted.

FIG. 3 is a rear-view of the apparatus on a smaller scale.

The hopper 1 containing the material to be spread is supported in a frame 13 which may be provided with two groundwheels 15. The bottom of the hopper 1 is constituted by a disc 2 having passage holes 3 and being secured on supports 14 attached to frame 13. Below the disc 2 a disc 4 is located provided with passage holes 5, lying below the holes 3 and disc 4 preferably is angularly adjustable for varying the passage area of the holes 3.

With the embodiment shown the spreading member consists of a spout 6 extending at a bowl 7, secured on a shaft 8, supported in a bearing 9 in frame 13. Shaft 8 with the bowl 7 between the extreme positions of the spout 6 shown in FIG. 2 in dotted lines and dot and dash lines respectively is angularly reciprocated by a crank 16 secured to a shaft 17 and connected by a rod 18 to a lever 19 secured on shaft 8.

A bowl-shaped body 11 with its open side directed downwards is secured to the angular end 10 of shaft 8 extending into the lower part of the hopper 1. Said body 11 in its conical wall above each hole 3 in disc 2 has an aperture or a recess 12. The upper edge of the aperture 12 preferably is located at a shorter distance from the axis of shaft 8 than the innermost point of the holes 3 in disc 2 so that the conical wall of the body 11 cannot binder the passage of the material to the holes 3.

It is to be noted that the circumferential wall of the agitating body 11 need not be conical when the bottom disc 2 of the hopper 1 itself is conical. If the bottom of the hopper 1 constituted by the disc 2 is not stationary, but moves together with the bowl 7, the agitating body 1 may be stationary as only the relative movement of the agitating body with respect to disc 2 is of importance.

What I claim is:
1. Apparatus for spreading particulate material comprising, in combination,
    a storage hopper having a bottom wall portion provided with an aperture,
    a spreading member disposed below said aperture in said bottom wall portion for receiving material passing therethrough,
    means for oscillating said spreading member to sling material therefrom,
    an agitating member located in said hopper above said bottom wall portion thereof, said agitating member having a frusto-conical skirt portion flaring downwardly and outwardly above said bottom wall portion and terminating in a lower edge disposed in spaced relation above said bottom wall portion, said skirt portion having a notch extending upwardly from said lower edge of said skirt defining opposite side edges angling upwardly away from said bottom wall portion, said agitating member being connected to said means for oscillation thereby to sweep said notch back and forth over said aperture in said bottom wall portion.
2. The apparatus according to claim 1 wherein said bottom wall portion is provided with a plurality of apertures and said agitating member is provided with a like number of notches.
3. Apparatus for spreading particulate material comprising, in combination,
    a storage hopper having a bottom wall portion provided with an aperture,
    an agitating member of generally circular form in plan view and having an annular portion presenting a marginal edge disposed in close proximity to said bottom wall portion of the hopper, said annular portion and said bottom wall portion lying in convergent planes to define a pocket therebetween and so that a projection of said marginal edge cuts across said aperture,
    means for causing relative oscillation between said agitating member and said bottom wall portion, said annular portion having a notch extending inwardly from said marginal edge thereof, said notch being positioned to have a mean position during its oscillation which is in registry above and said aperture,
and oscillatory spreading means for receiving material passing through said aperture.

4. Apparatus according to claim 3 wherein said bottom wall portion is flat and said annular portion is frustoconical.

References Cited

UNITED STATES PATENTS 2,297,642  9/1942  White _____ 222—242 X

FOREIGN PATENTS 224,820  1/1959  Australia.

ROBERT B. REEVES, *Primary Examiner.*

HADD S. LANE, *Examiner.*